United States Patent
Nam

(10) Patent No.: US 10,577,085 B2
(45) Date of Patent: Mar. 3, 2020

(54) AERODYNAMIC LIFT ENHANCING SYSTEM FOR A FLYING AUTOMOTIVE VEHICLE

(71) Applicant: Toyota Motor Engineering & Manufacturing North America, Inc., Erlanger, KY (US)

(72) Inventor: Taewoo Nam, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 352 days.

(21) Appl. No.: 15/449,951

(22) Filed: Mar. 4, 2017

(65) Prior Publication Data

US 2017/0240270 A1  Aug. 24, 2017

(51) Int. Cl.
  *B64C 21/04* (2006.01)
  *B60F 5/02* (2006.01)
  (Continued)

(52) U.S. Cl.
  CPC ............ *B64C 21/04* (2013.01); *B60F 5/02* (2013.01); *B64C 37/00* (2013.01); *B64D 27/14* (2013.01);
  (Continued)

(58) Field of Classification Search
  CPC . B60F 5/02; B60S 1/54; B64C 1/0009; B64C 3/141; B64C 21/02; B64C 21/025;
  (Continued)

(56) References Cited

U.S. PATENT DOCUMENTS 2,312,187 A    2/1943  Patterson
4,052,002 A   10/1977  Stouffer et al.
(Continued)

FOREIGN PATENT DOCUMENTS

GB        312910 A  *  11/1930  ............. B60S 1/026

OTHER PUBLICATIONS

Seele et al.; "Performance Enhancement of a Vertical Tail Model with Sweeping Jet Actuators"; NASA STI; Jan. 7, 2013; pp. 1-18 (18 pages).
(Continued)

*Primary Examiner* — Nicholas McFall
(74) *Attorney, Agent, or Firm* — Christopher G. Darrow; Darrow Mustafa PC

(57) ABSTRACT

An aerodynamic lift enhancing system for increasing aerodynamic lift generated by a body of an automotive flying vehicle is disclosed. The automotive flying vehicle includes a vehicle body enclosing a passenger compartment and having an upper surface at least partially defined by a hood, a roof extending over the passenger compartment, and a front windshield disposed between the hood and roof. The front windshield includes a leading edge positioned proximate a trailing edge of the hood and a trailing edge positioned adjacent the roof. The automotive flying vehicle includes wings extending laterally outward from the vehicle body. The aerodynamic lift enhancing system includes an air discharge nozzle located upstream from the leading edge of the front windshield, the air discharge nozzle operable to discharge a stream of air over the upper surface of the vehicle.

17 Claims, 5 Drawing Sheets

(51) Int. Cl.
  *B64C 37/00* (2006.01)
  *B64D 27/14* (2006.01)
  *F01D 15/10* (2006.01)
  *F01D 25/30* (2006.01)
(52) U.S. Cl.
  CPC ............. *F01D 15/10* (2013.01); *F01D 25/30* (2013.01); *F05D 2220/32* (2013.01); *F05D 2240/128* (2013.01)
(58) Field of Classification Search
  CPC ......... B64C 21/04; B64C 21/06; B64C 21/08; B64C 27/325
  See application file for complete search history.

(56) References Cited

U.S. PATENT DOCUMENTS

| | | | |
|---|---|---|---|
| 4,157,161 A | | 6/1979 | Bauer |
| 4,250,799 A | * | 2/1981 | Stouffer ................. B05B 1/083 239/284.1 |
| 5,419,005 A | * | 5/1995 | Mori ....................... B60S 1/544 15/250.01 |
| 5,617,608 A | * | 4/1997 | Primlani ................. B60S 1/54 15/250.001 |
| 6,073,882 A | | 6/2000 | Zieger |
| D616,805 S | | 6/2010 | Zha |
| 8,262,031 B2 | | 9/2012 | Zha et al. |
| 9,156,550 B2 | | 10/2015 | Nam |
| 2010/0127129 A1 | | 5/2010 | Zha et al. |
| 2014/0102542 A1 | | 4/2014 | Raghu |
| 2014/0103134 A1 | | 4/2014 | Raghu |

OTHER PUBLICATIONS

Graff et al.; "Sweeping Jet Actuators—a New Design Tool for High Lift Generation"; NASA STI; May 20, 2013; pp. 1-25 (25 pages).
Bauer et al.; "Experimental Investigation of the High-lift Performance of a Two-element Configuration with a Two-stage Actuator System"; American Institute of Aeronautics and Astronautics; 2013; pp. 1-17 (17 pages).

* cited by examiner

AERODYNAMIC LIFT ENHANCING SYSTEM FOR A FLYING AUTOMOTIVE VEHICLE

BACKGROUND

A flying automotive vehicle (also known as a flying car) is a hybrid vehicle that combines the flying capability of an aircraft with the option of being driven as an automobile on the ground. A flying automotive vehicle is capable of providing door-to-door aerial transportation, such as from home to work or to the supermarket, as conveniently as a car, but without the requirement for roads, runways or other specially-prepared operating areas.

Flying automotive vehicles may include wings that provide aerodynamic lift for flying. Although a body of the vehicle may also provide some aerodynamic lift, typically a majority of the lift is provided by the wings. Wings large enough for flying, however, may hinder operation of the vehicle as a car. To overcome this limitation, some proposed designs include stowable wings that may be extended for flying, but which may be moved to a more compact stowed position to enable the vehicle to navigate city traffic in between landings and take-offs. Unfortunately, the additional mechanism required to move the wings between the extended and stowed position may add significant cost, weight and complexity to the vehicle.

SUMMARY

Disclosed herein is an aerodynamic lift enhancing system for increasing aerodynamic lift generated by a body of an automotive flying vehicle. The automotive flying vehicle may include a vehicle body enclosing a passenger compartment and having an upper surface at least partially defined by a hood, a roof extending over the passenger compartment, and a front windshield disposed between the hood and roof. The flying automotive vehicle may include wings extending laterally outward from the body of the vehicle to provide aerodynamic lift for flying. The wings may provide the majority of lift, with the vehicle body generally contributing only a small portion. The wings unfortunately increase the size of the vehicle, which may make it difficult to operate the vehicle on the ground as a conventional automobile. Decreasing the size of the wings to improve maneuverability on the ground, however, may also decrease the amount of lift available for flying, particularly during takeoffs and landings. Any decrease in lift may at least partially be offset by increasing the aerodynamic lift provided by the vehicle body. This may be accomplished by selectively directing a stream of air over a front windshield and upper surface of the vehicle body to increase the aerodynamic lift generated by the vehicle body. This can reduce the amount of lift the wings need to generate, thus allowing for smaller and more compact wings. The air stream may be introduced through injection nozzles located in a gap formed between a hood of the vehicle and a cowl adjoining a lower edge of the front windshield. A portion of the airstream may be collected in an air scoop positioned near a rear of the vehicle and recirculated back to the injection nozzles to be reintroduced into the airstream flowing over the upper surface of the vehicle.

BRIEF DESCRIPTION OF THE DRAWINGS

The various features, advantages and other uses of the present apparatus will become more apparent by referring to the following detailed description and drawings, in which.

DETAILED DESCRIPTION

Figure 1:
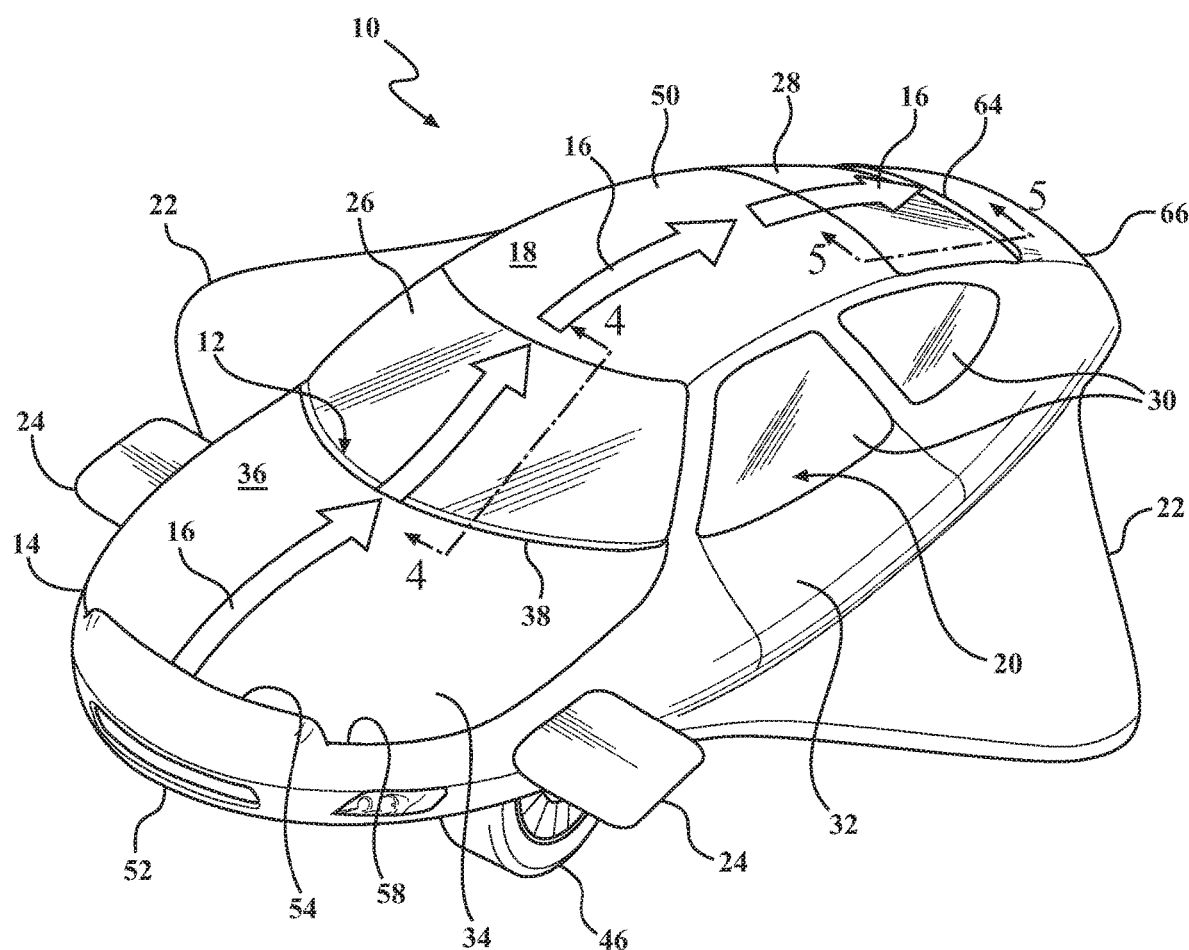
FIG. 1 is a schematic perspective view of a flying automotive vehicle employing an aerodynamic lift enhancing system.

Disclosed is an apparatus for selectively increasing aerodynamic lift generated by a body of a flying automotive vehicle. The flying automotive vehicle may include wings extending laterally outward from the body of the vehicle to provide aerodynamic lift for flying. The wings may provide a majority of lift, with the vehicle body generally contributing only a small portion. The wings unfortunately increase the size of the vehicle, which may make it difficult to operate the vehicle on the ground as a conventional automobile. Decreasing the size of the wings to improve maneuverability on the ground, however, may also decrease the amount of lift available for flying, particularly during takeoffs and landings. Any decrease in lift may at least partially be offset by increasing the aerodynamic lift provided by the vehicle body. This may be accomplished by selectively directing a stream of air over a front windshield and upper surface of the vehicle body to increase the aerodynamic lift generated by the vehicle body. This can reduce the amount of lift the wings need to generate, thus allowing for smaller and more compact wings. The air stream may be introduced through injection nozzles located in a gap formed between a hood of the vehicle and a cowl adjoining a lower edge of the front windshield. A portion of the airstream may be collected in an air scoop positioned near a rear of the vehicle and recirculated back to the injection nozzles to be reintroduced into the airstream flowing over the upper surface of the vehicle.

Referring now to the discussion that follows and also to the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIG. 1, an automotive flying vehicle 10 may include an aerodynamic lift enhancing system 12 for selectively increasing the portion of aerodynamic lift generated by a body 14 of the vehicle. The aerodynamic lift enhancing system 12 is operable to direct an airstream 16 over an upper surface 18 of the vehicle. The airstream 16 increases the portion of aerodynamic lift generated by the body 14. The aerodynamic lift enhancing system 12 may be employed with any of a variety of automotive flying vehicles to selectively increase aerodynamic lift generated by the body of the vehicle. The automotive flying vehicle 10 depicted in the drawing figures is intended only for purposes of describing configurations and operation of the aerodynamic lift enhancing system 12, and is not intended to limit application of the aerodynamic lift enhancing system 12 to a particular automotive flying vehicle configuration. The aerodynamic lift enhancing system 12 may be employed with other automotive flying vehicles having significantly different configurations from that which is illustrated in the drawing figures.

Figure 3:
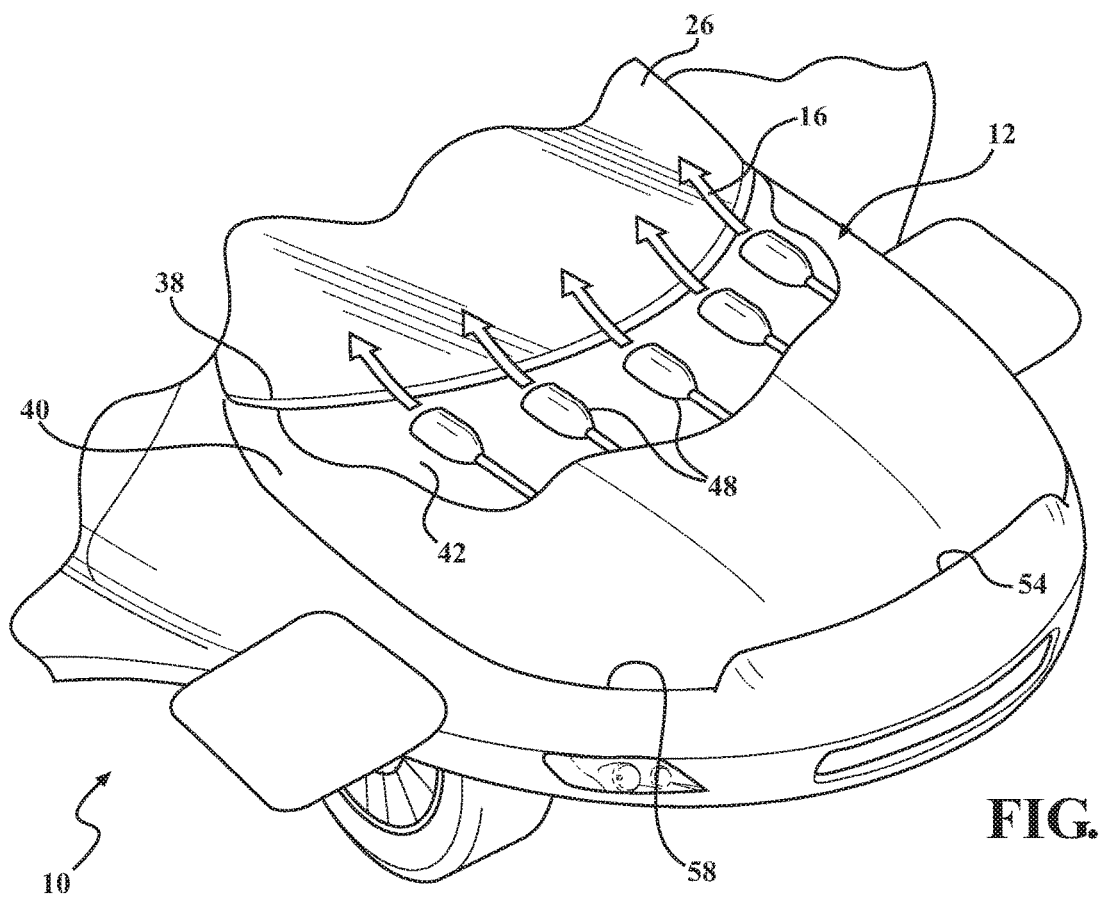
FIG. 3 is a schematic partial perspective view of the flying automotive vehicle of FIG. 1 with a portion of a hood of the vehicle removed to illustrate a series of injection nozzles employed with the aerodynamic lift enhancing system.
Figure 2:
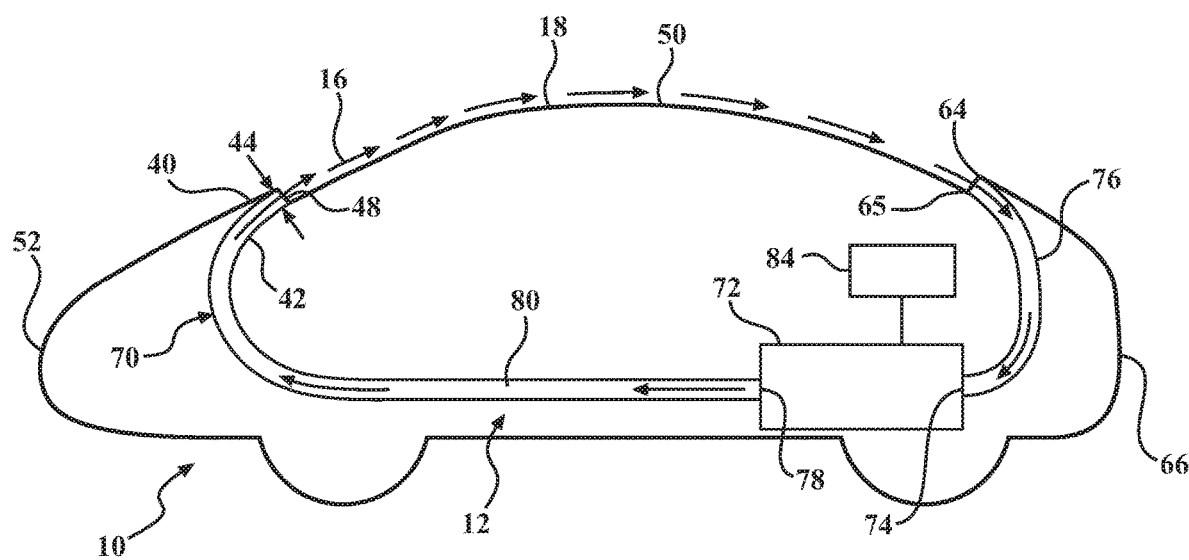
FIG. 2 is a schematic cross-sectional view of the flying automotive vehicle of FIG. 1 illustrating features of the aerodynamic lift enhancing system.

With reference to FIGS. 1-3, the automotive flying vehicle 10 may generally include the body 14 enclosing a passenger compartment 20 for transporting a driver and passengers. A pair of wings 22 capable of providing aerodynamic lift for flying may extend laterally outward from the body 14. The automotive flying vehicle 10 may also include various other flight control surfaces, such as, for example, front stabilizers 24, rear stabilizers (not shown), vertical stabilizers (not shown), as well as other aerodynamic surfaces for providing aerodynamic lift and control of the vehicle while in flight. The body 14 of the automotive flying vehicle 10 may be similarly configured as a conventional automotive vehicle, or may have any other shape and/or configuration. The automotive flying vehicle 10 may have multiple windows, which may include a front windshield 26, a rear window 28, and one or more side windows 30. One or more doors 32 may provide access to the passenger compartment 20 of the vehicle, as well as various storage compartments. A front portion 34 of the automotive flying vehicle 10 may include a hood 36 extending forward of a lower edge 38 of the front windshield 26. A rear portion 40 of the hood 36 adjacent front windshield 26 may partially overlay a cowl 42 adjoining the lower edge 38 of the front windshield 26. A gap 44 (see FIG. 2) may be formed between the rear portion 40 of the hood 36 and the cowl 42 that extends widthwise along the lower edge 38 of the front windshield 26.

The automotive flying vehicle 10 may include multiple wheels 46 for supporting the vehicle on the ground when operating as a car and during takeoffs and landings. Various power plants may be employed to provide power for propelling the automotive flying vehicle 10, such as, for example, an internal combustion engine, electric motor and gas turbine, to name a few. Multiple similarly or differently configured power plants may be employed. Propulsion for flying may be provided by conventional means, such as a rotating propeller and gas turbine engine, or another flight propulsion system may be employed.

With reference to FIGS. 1-5, the aerodynamic lift enhancing system 12 may include at least one injection nozzle 48 for discharging the airstream 16 flowing over the front windshield 26 and upper surface 18 of the automotive flying vehicle 10. The airstream 16 may be directed over a substantial portion of the upper surface 18 of the automotive flying vehicle 10. The injection nozzle 48 may include multiple injection nozzles arranged side-by-side across a width of the automotive flying vehicle 10, as illustrated, for example, in FIG. 3, or may include a single injection nozzle extending substantially across the width of the vehicle. The injection nozzles 48 may be arranged upstream from the lower edge 38 of the front windshield 26 to allow the airstream 16 to be directed over the front windshield 26 and a roof 50 of the vehicle. This arrangement enables the injected airstream 16 to provide the front windshield 26 with deicing capabilities as well as help maintain the front windshield 26 clear of rain water and debris.

The injection nozzles 48 may alternatively be located further upstream from the front windshield 26 and closer to a front 52 of the automotive flying vehicle 10. For example, one or more injection nozzles 48 or an injection slot 54 (see for example, FIG. 1) may be provided near a leading edge 58 of the hood 36. Air discharged from the injection slot 54 forms the airstream 16 that flows over the hood 36 before reaching the front windshield 26. The airstream 16 may also be introduced at another location on the automotive flying vehicle 10, provided the airstream 16 is directed to flow over the front windshield 26.

Figure 4:
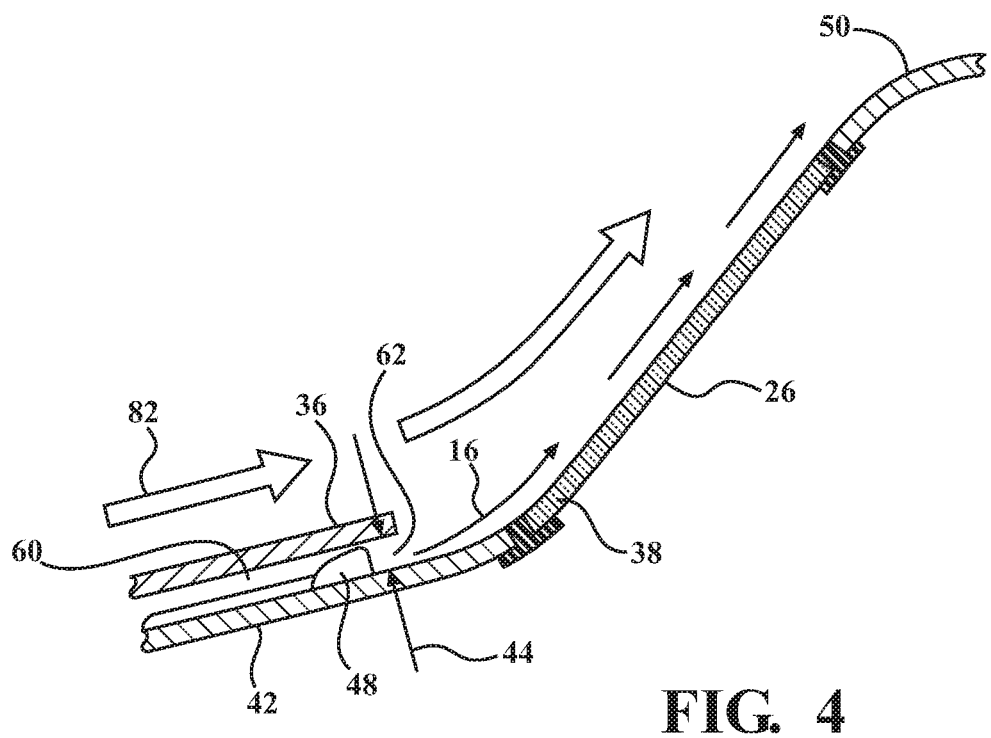
FIG. 4 is a schematic partial cross-sectional view of a windshield region of the flying automotive vehicle of FIG. 1.

With particular reference to FIG. 4, the injection nozzles 48 may be concealed within a cavity 60 formed between the hood 36 and the cowl 42. The hood 36 may be spaced from the cowl 42 to form an opening 62 through which air discharged from the injection nozzles 48 exits the cavity 60 and flows over the front windshield 26 and upper surface 18 of the automotive flying vehicle 10.

Figure 5:
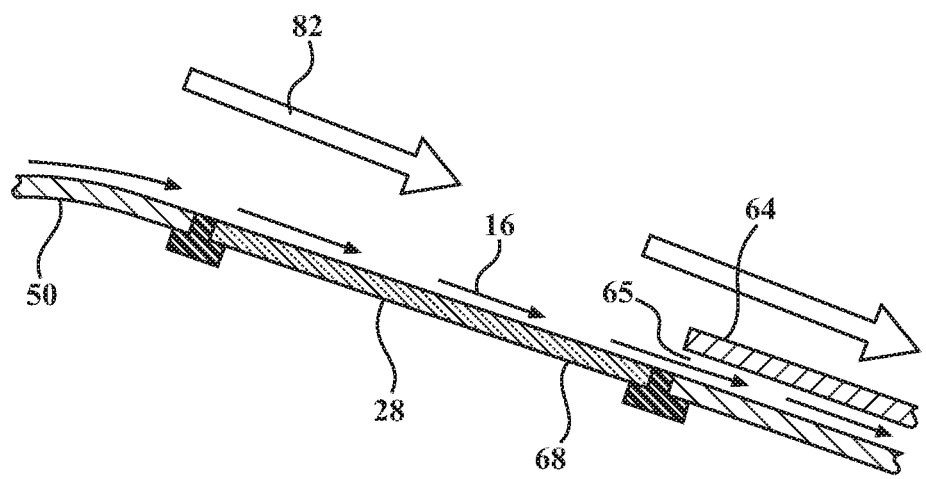
FIG. 5 is a schematic partial cross-sectional view of a rear window region of the flying automotive vehicle of FIG. 1.

With reference to FIGS. 1, 2 and 5, the aerodynamic lift enhancing system 12 may include an air scoop 64 located along the upper surface 18 near a rear 66 of the automotive flying vehicle 10. The air scoop 64 is configured to capture at least a portion of the airstream 16 passing over the upper surface 18 of the automotive flying vehicle 10. An opening 65 of the air scoop 64 may be generally oriented toward the front 52 of the vehicle and extend widthwise across the vehicle to capture at least a portion of the airstream 16 flowing over the vehicle. The opening 65 in the air scoop 64 may include multiple openings or be configured as a single elongated opening. The air scoop may be arranged along a bottom edge 68 of the rear window 28, or alternatively, located elsewhere on the vehicle.

With reference to FIG. 2, the aerodynamic lift enhancing system 12 may include a network of air passages 70 fluidly connecting the air scoop 64 located near the rear 66 of the automotive flying vehicle 10 with the injection nozzles 48 located upstream from the front windshield 26. The air passages 70 are depicted schematically in FIG. 2 as a single passage, but in practice may include a network of interconnected passages, depending on the requirements of the particular application. The air passages 70 may include various branches as may be required to fluidly connect the air scoop 64 to the injection nozzle 48.

With continued reference to FIG. 2, the aerodynamic lift enhancing system 12 may include an air pumping system 72 for supplying a stream of pressurized air to the injection nozzles 48. The air pumping system 72 may include an inlet port 74 fluidly connected to the air scoop 64 by an inlet passage 76. An outlet port 78 of the air pumping system 72 may be fluidly connected to the injection nozzles 48 by an outlet passage 80. Air captured by the air scoop 64 may travel through the inlet passage 76 to the air pumping system 72 where it compressed. The compressed air may exit the air pumping system 72 at the outlet port 78 and travel through the outlet passage 80 to the injection nozzles 48. The compressed air is discharged from the injection nozzles 48 to form the airstream 16 flowing over the front windshield 26 and the upper surface 18 of the automotive flying vehicle 10. A portion or the entire airstream 16 may partially or completely mix with a primary airstream 82 (see FIGS. 4 and 5) flowing over the vehicle prior to entering the air scoop 64.

With continued reference to FIG. 2, the aerodynamic lift enhancing system 12 may include a control system 84 for selectively controlling operation of the aerodynamic lift enhancing system 12. The control system 84 may be used to selectively control the amount of aerodynamic lift enhancement that is employed by adjusting the flow of air to the injection nozzles 48. For example, there may be instances in which aerodynamic lift enhancement is desirable, such as during takeoff and landing. Conversely, there may be instances in which aerodynamic lift enhancement is less beneficial or may not be required, for example, when operating the vehicle at cruise conditions. To accommodate the varying operating conditions, the control system 84 may be configured to adjust the amount of air flowing to the injection nozzles 48 from a zero flow to a maximum flow capacity of the aerodynamic lift enhancing system 12. The aerodynamic lift enhancing system may be operated, for example, in active mode, wherein air from the air pumping system 72 is delivered to the injection nozzles 48, and an inactive mode, wherein the supply of air to the injection nozzle 48 is substantially zero.

Figure 6:
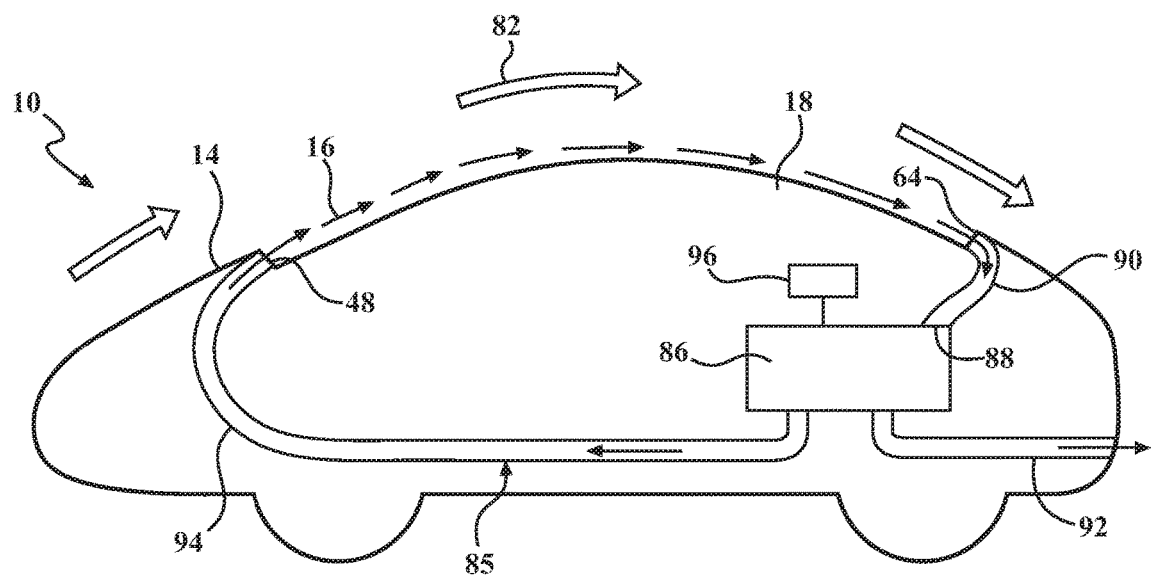
FIG. 6 is a schematic cross-sectional view of the flying automotive vehicle with the aerodynamic lift enhancing system employing an alternately configured air pumping system operating in an active mode.
Figure 7:
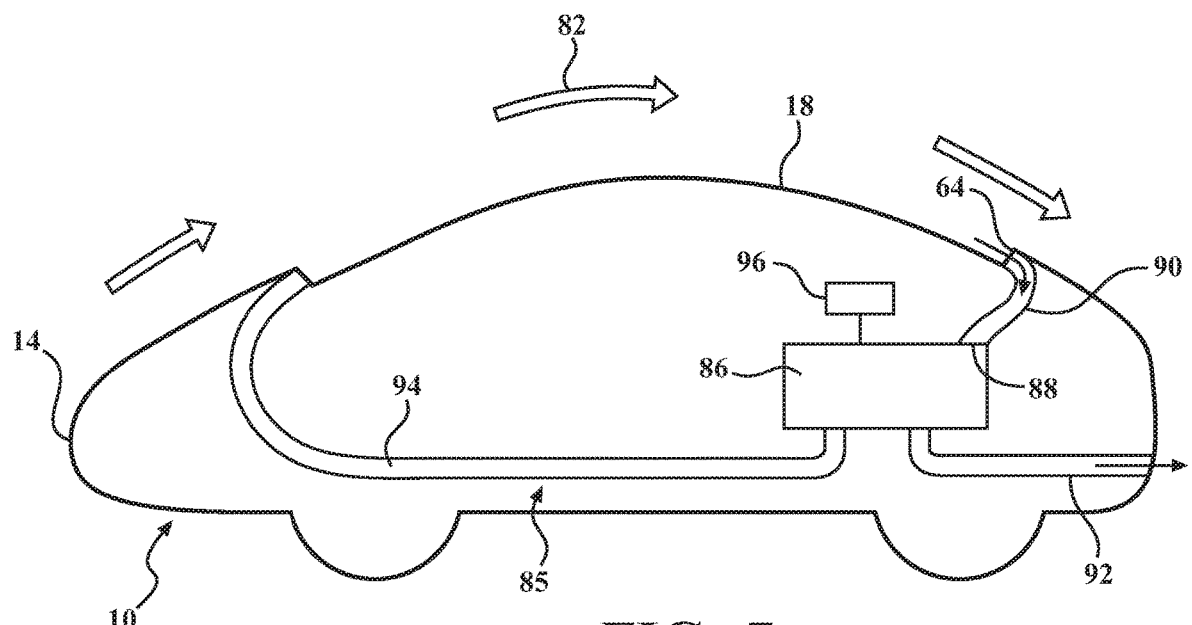
FIG. 7 is a schematic cross-sectional view of the flying automotive vehicle of FIG. 6 with the alternately configured pumping system operating in an inactive mode.

With reference to FIGS. 6 and 7, an alternately configured aerodynamic lift enhancing system 85 may employ a gas turbine engine 86 for delivering a supply of compressed air to the injection nozzles 48 and for providing power to other vehicle systems. The gas turbine engine 86 may have any of a variety of configuration, and may include for example, a compressor for generating a flow of compressed air and a turbine for extracting energy from a flow of hot gas produced by combusting a mixture of fuel and the compressed air. Exhaust gas from the gas turbine engine 86 or bleed air from the compressor, or mixture of the two airflows, may be used to supply the flow of compressed air to injection nozzles 48. This may reduce onboard power consumption to operate the lift enhancing system 12. The gas turbine engine 86 may be configured to generate rotational torque that may be used to propel the vehicle and power various systems on the vehicle. Thrust generated by the gas turbine engine may also be used to propel the vehicle.

An inlet 88 of the gas turbine engine 86 may be fluidly connected to the air scoop 64 located along the upper surface 18 of the vehicle body 14 through a compressor inlet passage 90. An exhaust duct of the gas turbine engine 86 may be connected to an exhaust discharge passage 92 that may open to the vehicle's surroundings. Air collected by the air scoop 64 may travel through the compressor inlet passage 90 to an inlet of the compressor. Fuel may be combined with the compressed air and combusted in a combustion chamber of the gas turbine engine 86. Hot combustion gases may exit the combustion chamber and pass through the turbine, which extracts energy from the combustion gases. Exhaust gases exiting the gas turbine engine may pass through the exhaust discharge passage 92 and discharged to atmosphere.

With continued reference to FIG. 6, a portion of the compressed air generated by the compressor of the gas turbine engine 86 may be used to supply the injection nozzles 48. An injection nozzle supply passage 94 may fluidly connect the compressor to the injection nozzles 48. Generally, only a portion of the compressed air from the compressor is diverted to the injection nozzles 48, as illustrated, for example, in FIG. 6.

A control system 96 may be employed for controlling operation of the gas turbine engine 86 and/or the flow of compressed air from the compressor of the gas turbine engine to the injection nozzles 48. The control system 96 may be used to selectively adjust the flow of air from the compressor to the injection nozzles 48. The amount of air flowing to the injection nozzles 48 may be varied within a range of zero flow, as illustrated, for example, in FIG. 7, to a maximum flow rate that may be bled from the compressor of the gas turbine engine 86. The aerodynamic lift enhancing system 85 is illustrated operating in the active mode in FIG. 6, wherein a supply of air from the gas turbine engine 86 is delivered to the injection nozzles 48, and the inactive mode in FIG. 7, wherein substantially no air is delivered to the injection nozzles 48.

Figure 8:
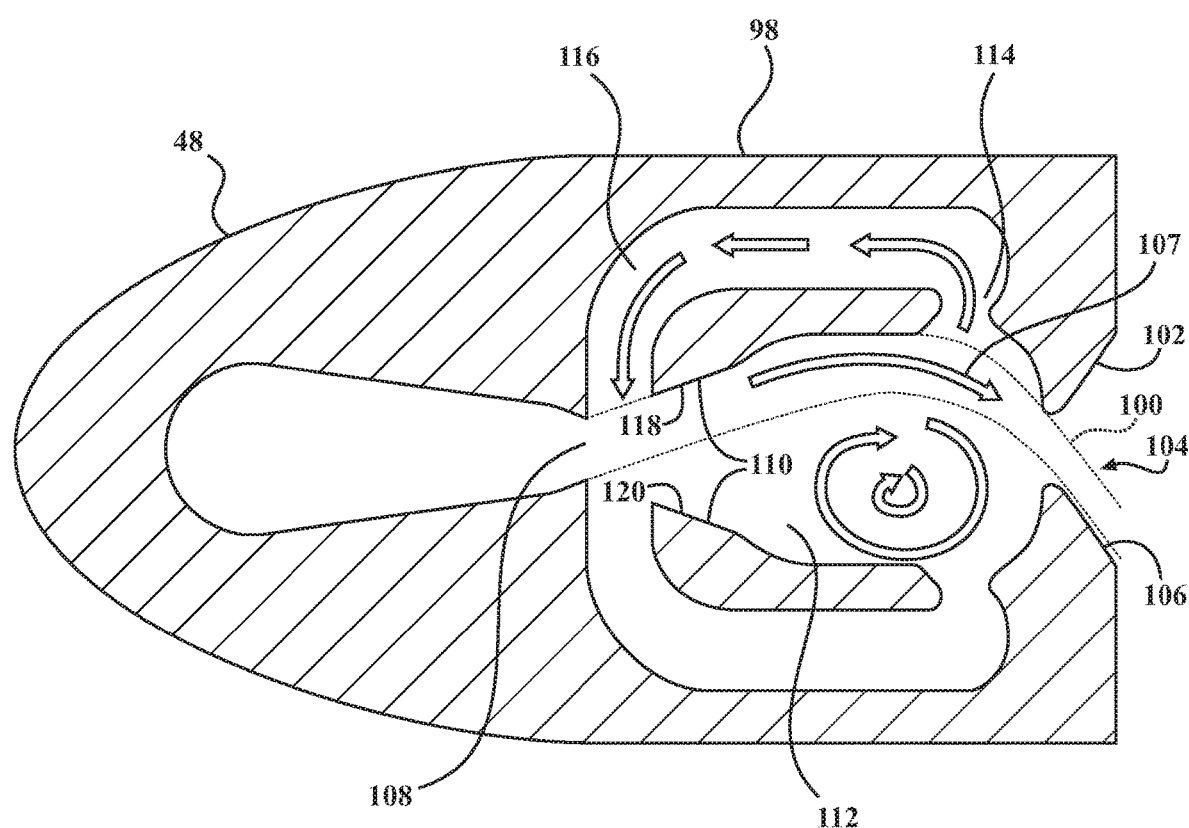
FIG. 8 is a schematic cross-sectional view of a sweeping jet actuator that may be employed with the injection nozzle.

With reference to FIG. 8, the injection nozzle 48 may employ a sweeping jet actuator 98 to help minimize the amount of air required to produce the airstream 16 while also maximizing aerodynamic lift enhancement. The sweeping jet actuator 98 may include various configurations. An example of one such configuration is schematically illustrated in FIG. 8. The sweeping jet actuator 98 operates to generate an air jet that automatically sweeps back and forth to cover the front windshield 26 and upper surface 18 of the vehicle with the airstream 16. The sweeping jet actuator 98 continuously varies the direction of the air jet to create a sweeping action. The sweeping action enables the air jet to cover a larger surface area with less flow than may be possible using multiple injectors having a generally fixed nozzle direction.

A schematic illustration of a sweeping jet actuator 98 that may be employed with the injection nozzle 48 is illustrated in FIG. 8. The sweeping jet actuator 98 emits a continuous air jet 100 that continuously flips from one side 102 of an outlet nozzle 104 to the other side 106. The air jet 100 forms the airstream 16 that passes over the front windshield 26 and upper surface 18 of the automotive flying vehicle 10. Air 107 passing through an entrance nozzle 108 attaches itself to one of the solid surfaces forming walls 110 of a main cavity 112 of the sweeping jet actuator 98. The air jet 100 curves as it rushes to the outlet nozzle 104, increasing a pressure at an inlet 114 to an upper feedback channel 116. This creates flow in the upper feedback channel 116 that pushes the entering jet away from an upper wall 118 and toward an opposite wall 120 of the main cavity 112 and repeats the process. FIG. 8 illustrates one example of the type of sweeping jet actuator that may be employed with the injection nozzles 48. Other configurations of sweeping jet actuators may also be employed.

It is intended that the scope of the present methods and apparatuses be defined by the following claims. However, it must be understood that the disclosed systems and methods may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. An apparatus for enhancing aerodynamic lift of an automotive vehicle body, the apparatus comprising:
    a vehicle body enclosing a passenger compartment and including an upper surface at least partially defined by a hood, a roof extending over the passenger compartment, and a front windshield disposed between the hood and the roof, the front windshield including a leading edge positioned proximate a trailing edge of the hood, the front windshield including a trailing edge positioned adjacent the roof;
    a wing extending laterally outward from the vehicle body;
    an air discharge nozzle located upstream of the leading edge of the front windshield, the air discharge nozzle operable to discharge a stream of air over the upper surface of the vehicle body; and
    an air scoop located along the upper surface of the vehicle body and downstream of the trailing edge of the front windshield, the air scoop being located proximate a rear end of the vehicle body,
    at least one passage fluidly connecting the air scoop to the air discharge nozzle, whereby air collected by the air scoop is routed toward a front end of the vehicle body through the at least one passage, whereby the air collected by the air scoop is discharged by the air discharge nozzle into an airstream flowing over the upper surface of the vehicle body.

2. The apparatus of claim 1, further comprising a pump having an inlet fluidly connected to the air scoop and an outlet fluidly connected to the air discharge nozzle.

3. The apparatus of claim 1, wherein the air scoop includes an opening for capturing a stream of air passing over the upper surface of the vehicle body from a front of the vehicle body to rear of the vehicle body.

4. The apparatus of claim 3, wherein the opening in the air scoop is oriented substantially toward the front of the vehicle body.

5. The apparatus of claim 1, wherein the air discharge passage nozzle includes a sweeping jet actuator.

6. The apparatus of claim 5, further comprising a plurality of spaced sweeping jet actuators arranged proximate the leading edge of the front windshield.

7. The apparatus of claim 1, wherein the air discharge nozzle is located proximate the front end of the vehicle body.

8. The apparatus of claim 1, wherein the air discharge nozzle is located in gap between the hood and the front windshield.

9. An apparatus for enhancing aerodynamic lift of an automotive vehicle body, the apparatus comprising:
    a vehicle body enclosing a passenger compartment and including an upper surface at least partially defined by a hood, a roof extending over the passenger compartment, and a front windshield disposed between the hood and the roof, the front windshield including a leading edge positioned proximate a trailing edge of the hood, the front windshield including a trailing edge positioned adjacent the roof;
    a wing extending laterally outward from the vehicle body;
    an air discharge nozzle located upstream of the leading edge of the front windshield, the air discharge nozzle operable to discharge a stream of air over the upper surface of the vehicle body;
    an air scoop located along the upper surface of the vehicle body and downstream of the trailing edge of the front windshield; and
    a pump having an inlet fluidly connected to the air scoop and an outlet fluidly connected to the air discharge nozzle, the pump including a gas turbine engine.

10. The apparatus of claim 9, wherein the air discharge nozzle is fluidly connected to a compressor of the gas turbine engine.

11. The apparatus of claim 9, wherein the air discharge nozzle is fluidly connected to an exhaust of the gas turbine engine.

12. The apparatus of claim 9, wherein the gas turbine engine is configured to power a generator.

13. An apparatus for enhancing aerodynamic lift of an automotive vehicle body, the apparatus comprising:
    a vehicle body enclosing a passenger compartment and including an upper surface at least partially defined by a hood, a roof extending over the passenger compartment, and a front windshield disposed between the hood and the roof, the front windshield including a leading edge positioned proximate a trailing edge of the hood, the front windshield including a trailing edge positioned adjacent the roof;
    a wing extending laterally outward from the vehicle body;
    an air discharge nozzle located upstream of the leading edge of the front windshield, the air discharge nozzle operable to discharge a stream of air over the upper surface of the vehicle body;
    an air scoop located along the upper surface of the vehicle body and downstream of the trailing edge of the front windshield;
    a pump having an inlet fluidly connected to the air scoop and an outlet fluidly connected to the air discharge nozzle; and
    a valve operable for controlling a flow of air from the air scoop to the air discharge nozzle.

14. An apparatus for enhancing aerodynamic lift of an automotive vehicle body, the apparatus comprising:
    a vehicle body at least partially defined by a roof extending over a passenger compartment and a front windshield disposed adjacent a leading edge of the roof;
    a wing extending laterally outward from the vehicle body;
    at least one sweeping jet actuator located upstream of the front windshield, the sweeping jet actuator including an air discharge nozzle oriented to discharge a sweeping stream of air along an outer surface of the front windshield; and
    an air scoop located along an upper surface of the vehicle body and downstream of a trailing edge of the front windshield, the air scoop being located proximate a rear end of the vehicle body,
    at least one passage fluidly connecting the air scoop to the at least one sweeping jet actuator, whereby air collected by the air scoop is routed toward a front end of the vehicle body through the at least one passage, whereby the air collected by the air scoop is discharged by the at least one sweeping jet actuator into an airstream flowing over the upper surface of the vehicle body.

15. The apparatus of claim 14, further comprising a hood located adjacent to a leading edge of the front windshield, the hood at least partially defining an opening between the hood and the front windshield, the air discharge nozzle oriented to direct a jet of air through the opening and onto the outer surface of the front windshield.

16. The apparatus of claim 14, further comprising a plurality of spaced sweeping jet actuators arranged along a leading edge of the front windshield.

17. The apparatus of claim 14, further comprising a pump fluidly connecting the air scoop to the at least one sweeping jet actuator.

* * * * *

UNITED STATES PATENT AND TRADEMARK OFFICE
CERTIFICATE OF CORRECTION

PATENT NO. : 10,577,085 B2
APPLICATION NO. : 15/449951
DATED : March 3, 2020
INVENTOR(S) : Taewoo Nam Page 1 of 1

It is certified that error appears in the above-identified patent and that said Letters Patent is hereby corrected as shown below:

In the Claims

Column 7, Lines 45-46, Claim 5: delete "air discharge passage nozzle" and insert --air discharge nozzle--

Signed and Sealed this
Twelfth Day of May, 2020

Andrei Iancu
*Director of the United States Patent and Trademark Office*